Figure 1:
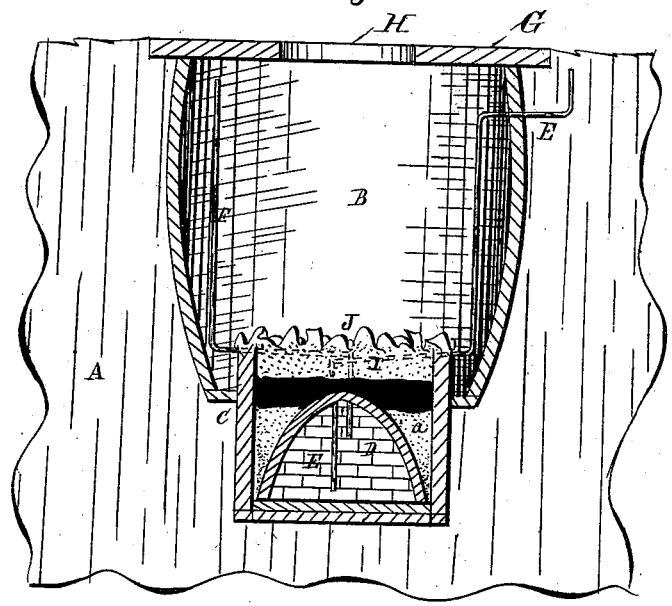

E. W. KIDNEY.
Filter.

No. 215,938. Patented May 27, 1879.

Witnesses.
W. H. Steele
J. T. Sargent

Inventor.
E. W. Kidney
per Burridge & Co
Attys.

UNITED STATES PATENT OFFICE.

EDWARD W. KIDNEY, OF OLMSTEAD FALLS, OHIO.

IMPROVEMENT IN FILTERS.

Specification forming part of Letters Patent No. 215,938, dated May 27, 1879; application filed February 3, 1879.

*To all whom it may concern:*

Be it known that I, EDWARD W. KIDNEY, of Olmstead Falls, in the county of Cuyahoga and State of Ohio, have invented a certain new and Improved Filter; and I do hereby declare that the following is a full, clear, and complete description thereof, reference being had to the accompanying drawings, making a part of the same.

The nature of this invention relates to purifying water by infiltration and cooling the same during the process of filtering. To this end a reservoir is constructed below the bottom of a cistern, into which the water is received as it percolates through certain filtering materials arranged above the reservoir, substantially as herein described, and represented in the drawings, of which—

Figure 2:
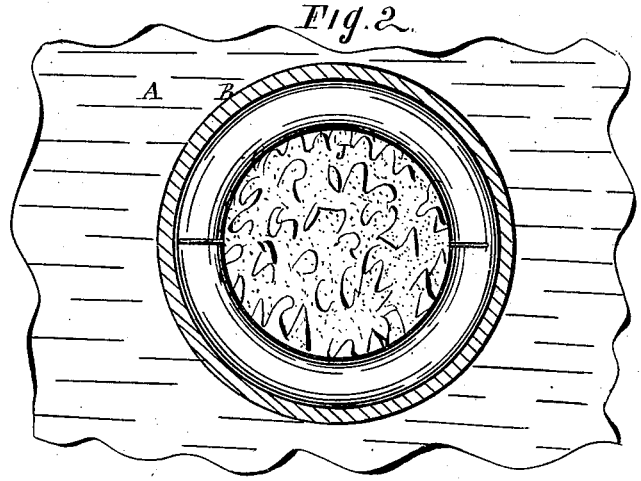

Figure 1 is a transverse vertical section of a cistern having constructed in connection therewith the filter and reservoir. Fig. 2 is a horizontal section, showing the bottom of the cistern.

Like letters of reference refer to like parts in the several views.

In the drawings, A represents the earth or ground in which is constructed a cistern or chamber, B, which may be of any holding capacity and of any desirable shape. The wall of the cistern may be of brick, and plastered in the ordinary way for making it tight.

In the bottom of the cistern is sunk a hole, which is walled and floored with brick and plastered water-tight, forming a receptacle, C, having its upper end projecting more or less above the bottom of the cistern. On the floor of the receptacle is built a cone-shaped reservoir, D, of brick, or other suitable material, which is not plastered and made water-tight, but is left bare, that it may be pervious to water.

E is a vent-pipe leading from the reservoir to the surface of the ground. F is an outlet or pump pipe extending from near the top of the reservoir to the crown of the cistern, or above the water it is expected to hold. G is the stone covering of the cistern, and H the hole therein for access to the inside thereof.

The space between the outside of the reservoir and the inside of the receptacle is partially filled with clean sand $a$, upon which is laid a layer of charcoal. Upon said layer of coal is laid a covering of coarse sand and stones, I and J, thereby filling the entire space, substantially as shown in the drawings.

The practical operation of the above-described filtering device is as follows: From the cistern B water flows into the reservoir by percolating through the stones, sand, and charcoal, and also through the porous bricks of which the reservoir is constructed. As the water flows into the reservoir the air escapes therefrom through the vent-pipe F. The percolation of the water through the filtering material is facilitated by the gravity of the water above in the cistern, which when thus filtered into the reservoir is purified from all foreign matter and cooled to that degree as to be palatable for drinking.

The water is drawn from the reservoir by a pump attached to the ground end of the outer end of the pipe E.

As above described, the filtering-reservoir is built under the cistern. It may, however, be built at one side, and the water conducted to it by a pipe, or it may be arranged in the floor of a cellar, and water from the cistern or other source be conducted to it by one or more pipes. It is preferred, however, to locate the reservoir under the cistern, as herein described, and shown in the drawings.

I am aware that filtering-cisterns have heretofore been patented, as Bartlett and Redfield, Nos. 142,737, of February 19, 1856, and 100,323, of March 1, 1870, and I do not claim, broadly, the combination of the filter within a cistern.

What I claim as my invention, and desire to secure by Letters Patent, is—

The filtering-reservoir D, located below the cistern B, having within it the dome-shaped filtering-wall, and supplied with the ventilating-pipe E, extending into the dome D, and outlet-pipe F from within the dome D, and covered with layers of filtering material, all substantially as and for the purpose described.

EDWARD W. KIDNEY.

Witnesses:
   J. H. BURRIDGE,
   HENRY ROUX.